United States Patent Office.

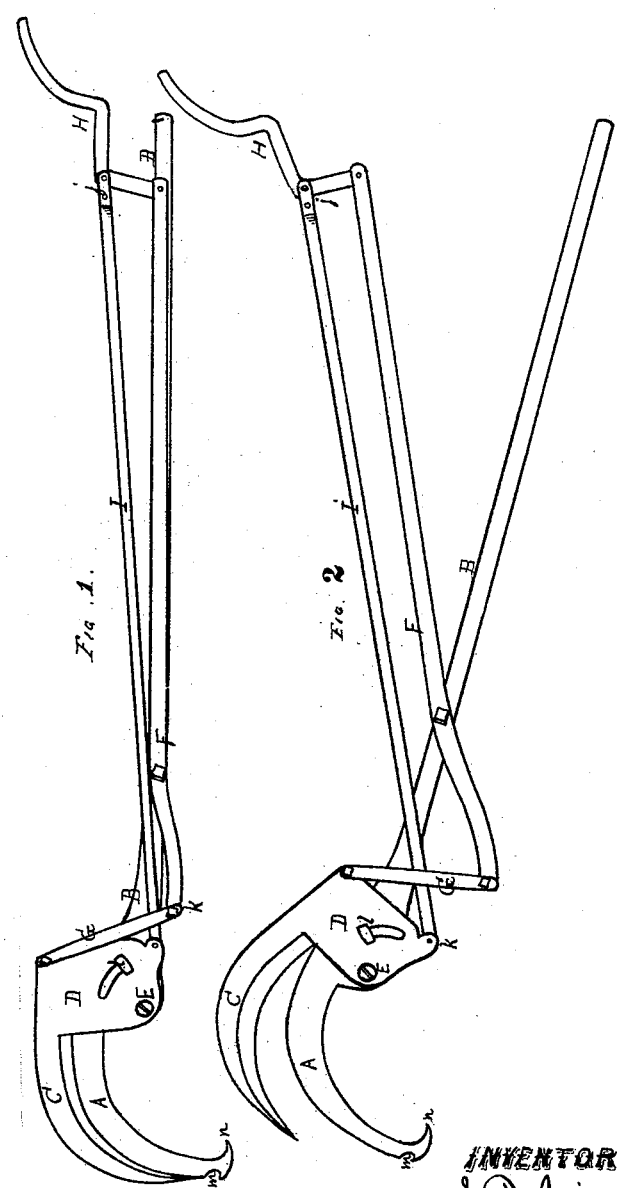

ERASMUS D. GAINES AND JOHN A. McMILLEN, OF CHICAGO, ILLINOIS.

Letters Patent No. 111,738, dated February 14, 1871.

IMPROVEMENT IN PRUNING-SHEARS.

The Schedule referred to in these Letters Patent and making part of the same.

*To all whom it may concern:*

Be it known that we, ERASMUS D. GAINES and JOHN A. McMILLEN, of Chicago, in the county of Cook and State of Illinois, have invented new and improved Pruning-Shears; and we do hereby declare the following to be a full, clear, and exact description thereof, reference being had to the accompanying drawing forming part of this specification, in which—

Figures 1 and 2 are side views, showing respectively the shears open and closed.

Similar letters of reference indicate corresponding parts in the several figures of the drawing.

Our invention has for its object to provide improved shears for pruning fruit-trees, shrubbery, &c., which shall be more convenient and efficient than those now in use, and which we will now proceed to describe in detail.

In the accompanying drawing—

A is the main blade, made in the form of a hook, and either cast upon or attached securely to the handle B.

C is the movable blade, also made in the form of a hook, upon a flat plate, D, which is pivoted at E to the main blade, as shown.

F is a short handle pivoted to the handle B, and connected at its forward end to the plate D by means of the connecting-rod G, which rod is pivoted to that corner of the plate diagonally opposite the pivot E.

H is a right-angular lever, pivoted to the outer end of the handle F, as shown; and I is a connecting-rod pivoted at one end to the angle $j$ of the lever H, and at its opposite end to the corner $k$ of the plate D.

The proximate edges of the blades are sharpened to form cutting-edges, and the movement of the pivoted blade is limited by the pin $l$ and the curved slot formed in the plate D.

In operating the shears the curved end of the lever H is grasped in one hand and the handle B in the other, and owing to the construction and arrangement of parts the blades are brought together with a powerful leverage.

Owing to the curvature of the blades a shearing cut is produced, which is as effective at the points of the blade as at their base.

The hooked end of the blade A is provided upon its cutting-edge with a small depression, $m$, by which twigs and small limbs can be severed without operating the handles of the shears.

The part $n$ of this blade forms a hook, by which the limbs of trees can be drawn within reach of the operator for pruning, &c.

By our invention pruning-shears are produced which are simple and economical in construction, and which are capable of the most efficient operation with handles of extreme length.

Having thus described our invention,

What we claim as new, and desire to secure by Letters Patent, is—

The pruning-shears, consisting of the curved blade A and handle B, the curved blade C formed upon the pivoted plate D, the pivoted handle F, angular lever H, and pivoted connecting-rods G I, all constructed, arranged, and operating substantially as herein shown and described.

ERASMUS D. GAINES.
JOHN A. McMILLEN.

Witnesses:
E. A. ELLSWORTH,
A. K. ELLSWORTH.